(12) United States Patent
Matsuda

(10) Patent No.: US 9,961,636 B2
(45) Date of Patent: May 1, 2018

(54) ELECTRONIC DEVICE SYSTEM, TERMINAL DEVICE, ELECTRONIC DEVICE SYSTEM CONTROL METHOD, AND CONTROL PROGRAM

(71) Applicant: CASIO COMPUTER CO., LTD., Shibuya-ku, Tokyo (JP)

(72) Inventor: Shimpei Matsuda, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 212 days.

(21) Appl. No.: 14/662,168

(22) Filed: Mar. 18, 2015

(65) Prior Publication Data
US 2015/0271753 A1   Sep. 24, 2015

(30) Foreign Application Priority Data

Mar. 20, 2014   (JP) ................................ 2014-057436

(51) Int. Cl.
*H04W 52/02* (2009.01)
(52) U.S. Cl.
CPC ... *H04W 52/0219* (2013.01); *H04W 52/0274* (2013.01); *Y02B 60/50* (2013.01)
(58) Field of Classification Search
None
See application file for complete search history.

(56) References Cited

U.S. PATENT DOCUMENTS

| | | | | |
|---|---|---|---|---|
| 5,691,979 A | * | 11/1997 | Cadd | H04B 1/7156 370/312 |
| 7,215,976 B2 | * | 5/2007 | Brideglall | G06K 7/0008 235/380 |
| 7,945,296 B2 | * | 5/2011 | Hubert | H04B 3/548 455/132 |

(Continued)

FOREIGN PATENT DOCUMENTS

| | | |
|---|---|---|
| JP | 0136027 A | 12/1989 |
| JP | 2001156788 A | 6/2001 |
| JP | 2001320453 A | 11/2001 |

OTHER PUBLICATIONS

Japanese Office Action (and English translation thereof) dated Jul. 31, 2017 issued in counterpart Japanese Application No. 2014-057436.

*Primary Examiner* — Steve R Young
(74) *Attorney, Agent, or Firm* — Holtz, Holtz & Volek PC

(57) ABSTRACT

An electronic device system of the present invention includes a first terminal device having a first wireless communicating section which performs wireless communication and a second terminal device having a second wireless communicating section which performs wireless communication and being configured to enter a sleep mode where an operation of part of circuits of the second wireless communicating section is stopped. The first wireless communicating section of the first terminal device generates and transmits a start notification signal which is not a modulated signal wave for releasing the sleep mode of the second terminal device. The second wireless communicating sec- (Continued)

tion of the second terminal device in the first sleep mode receives the start notification signal transmitted from the first wireless communicating section of the first terminal device and releases the sleep mode of the second terminal device depending on the value of the electric power of the start notification signal.

6 Claims, 13 Drawing Sheets

(56) References Cited

U.S. PATENT DOCUMENTS

| | | | |
|---|---|---|---|
| 8,861,576 B2* | 10/2014 | Sharma | H04W 52/0229 375/219 |
| 2002/0138199 A1* | 9/2002 | Brodie | G01C 21/005 701/469 |
| 2007/0226497 A1* | 9/2007 | Taylor | G06F 21/31 713/168 |
| 2008/0025279 A1* | 1/2008 | Young | H04W 52/0216 370/341 |
| 2008/0165716 A1* | 7/2008 | Choi | H04L 12/12 370/311 |
| 2011/0084815 A1* | 4/2011 | Fitzek | H04W 52/0229 340/10.33 |

* cited by examiner

ELECTRONIC DEVICE SYSTEM, TERMINAL DEVICE, ELECTRONIC DEVICE SYSTEM CONTROL METHOD, AND CONTROL PROGRAM

CROSS-REFERENCE TO RELATED APPLICATION

This application is based upon and claims the benefit of priority from the prior Japanese Patent Application No. 2014-057436, filed Mar. 20, 2014, the entire contents of which are incorporated herein by reference.

BACKGROUND OF THE INVENTION

1. Field of the Invention

The present invention relates to an electronic device system, terminal device, an electronic device system control method, and a control program for setting a device in a sleep mode when an unused state continues for a predetermined period.

2. Description of the Related Art

In recent years, portable electronic devices, such as smartphones (advanced portable telephones) and tablet terminals, are significantly prevalent. These electronic devices have a communication function, and wireless communication is used among various electronic devices for data transmission and reception. Also, electronic devices such as wristwatches and digital cameras having a communication function are recently increasing.

These portable electronic devices, which are activated by built-in batteries, have a problem in that the power consumption is increased when various functions including the above-described communication function are provided therein, whereby usable time by the batteries is disadvantageously shortened.

In particular, in a small-sized electronic device with small battery capacity, such as in a wristwatch, usable time by built-in batteries is an important factor that affects the device usability and performance.

In order to solve this problem, in many portable electronic devices, a method is adopted in which, when an unused state of an electronic device continues for a predetermined time period, the supply of driving power to the embedded electronic circuits is at least partially interrupted or stopped, and specific functions or most functions of the device are set to enter a sleep mode so as be temporarily stopped.

This type of electronic device is described in, for example, Japanese Patent Application Laid-Open (Kokai) Publication No. 2001-320453. In a technology disclosed therein, in order to improve the usability of a portable wireless communication device and prolong its usable time by a battery, the incoming call reception function is set to be in a sleep mode for a predetermined time period by a sleep mode switch provided to the wireless communication device being pressed (turned ON). Japanese Patent Application Laid-Open (Kokai) Publication No. 2001-320453 also discloses a technology in which, when a sleep mode release switch is pressed (turned ON) with the wireless communication device being in the sleep mode, the incoming call reception function is released from the sleep mode.

In this wireless communication device, the user is required to manually press (turn on) the sleep mode release switch to release the sleep mode, which is bothersome.

In addition, if the target wireless communication device is in a pocket, bag, or the like, the user is required to take it out every time it is necessary, which takes time.

As another method for releasing an electronic device having a wireless communication function from a sleep mode, a method is known in which a sleep mode is released from outside via normal wireless communication using a modulated signal wave. In this method, the user is not required to manually perform a sleep mode releasing operation, which reduces the bother of the releasing operation.

However, in this method, even when the electronic device is in the sleep mode, a normal communicating state which requires relatively high power consumption is kept so that wireless communication is constantly available. Therefore, there is a problem in that usable time is shortened when this method is used in an electronic device having relatively small battery capacity.

SUMMARY OF THE INVENTION

The present invention has an advantageous effect in that an electronic device system, a terminal device, an electronic device system control method, and a control program can be provided by which a sleep mode can be easily and quickly released with reduced power consumption so as to return to a normal operation mode.

In accordance with one aspect of the present invention, there is provided an electronic device system comprising: a first terminal device having a first wireless communicating section which performs wireless communication; and a second terminal device having a second wireless communicating section which performs wireless communication, and being configured to enter a first sleep mode where an operation of part of circuits of the second wireless communicating section is stopped, wherein the first wireless communicating section of the first terminal device generates and transmits a start notification signal which is not a modulated signal wave for releasing the first sleep mode of the second terminal device in the first sleep mode, and wherein the second wireless communicating section of the second terminal device in the first sleep mode receives the start notification signal transmitted from the first wireless communicating section of the first terminal device and releases the first sleep mode of the second terminal device depending on a value of electric power of the start notification signal.

In accordance with another aspect of the present invention, there is provided a terminal device comprising: a wireless communicating section which generates a start notification signal which is not a modulated signal wave for releasing a sleep mode of an other terminal device in the sleep mode where an operation of part of circuits is stopped, and transmits the start notification signal via wireless communication.

In accordance with another aspect of the present invention, there is provided a terminal device comprising: a wireless communicating section which receives, in a sleep mode where an operation of part of circuits is stopped, a start notification signal which is not a modulated signal wave transmitted from an other terminal device via wireless communication, and releases the sleep mode depending on a value of electric power of the start notification signal.

In accordance with another aspect of the present invention, there is provided a method for controlling an electronic device system including (i) a first terminal device having a first wireless communicating section which performs wireless communication and (ii) a second terminal device having a second wireless communicating section which performs wireless communication and being configured to enter a sleep mode where an operation of part of circuits of the second wireless communicating section is stopped, comprising: a step of generating a start notification signal which is not a modulated signal wave for releasing the sleep mode of the second terminal device in the sleep mode, and transmitting the start notification signal by the first wireless communicating section of the first terminal device, and a step of receiving the start notification signal transmitted from the first wireless communicating section of the first terminal device, by the second wireless communicating section of the second terminal device in the sleep mode, and releasing the sleep mode of the second terminal device depending on a value of electric power of the start notification signal.

In accordance with another aspect of the present invention, there is provided a non-transitory computer-readable storage medium having an electronic device system control program stored thereon that is executable by a computer in an electronic device system including (i) a first terminal device having a first wireless communicating section which performs wireless communication and (ii) a second terminal device having a second wireless communicating section which performs wireless communication and being configured to enter a sleep mode where an operation of part of circuits of the second wireless communicating section is stopped, the program being executable by the computer to perform functions comprising: processing for generating a start notification signal which is not a modulated signal wave for releasing the sleep mode of the second terminal device in the sleep mode, and transmitting the start notification signal by the first wireless communicating section of the first terminal device, and processing for receiving the start notification signal transmitted from the first wireless communicating section of the first terminal device, by the second wireless communicating section of the second terminal device in the sleep mode, and releasing the sleep mode of the second terminal device depending on a value of electric power of the start notification signal.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
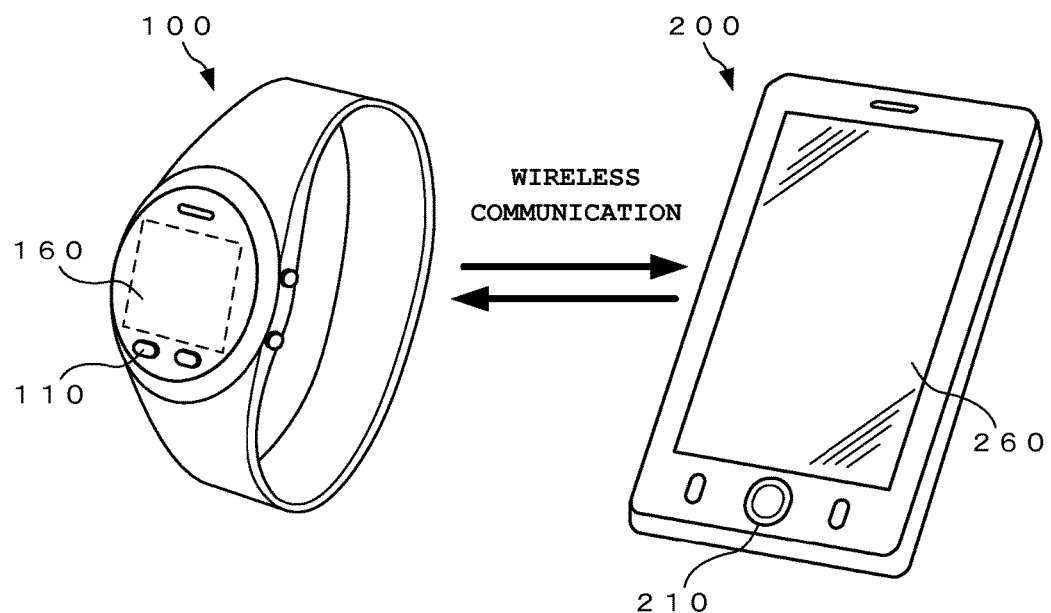
FIG. 1 is a schematic structural diagram showing an example of an electronic device system according to the present invention.

Hereafter, an electronic device system, a terminal device, an electronic device system control method, and a control program according to the present invention are described in detail with reference to the drawings.

Note that, although embodiments described below are provided with various technically-preferable limitations in order to carry out the present invention, these limitations are not intended to limit the scope of the present invention to the embodiments and examples shown in the drawings.

<Electronic Device System>

FIG. 1 is a schematic structural diagram showing an example of an electronic device system according to the present invention.

Figure 2:
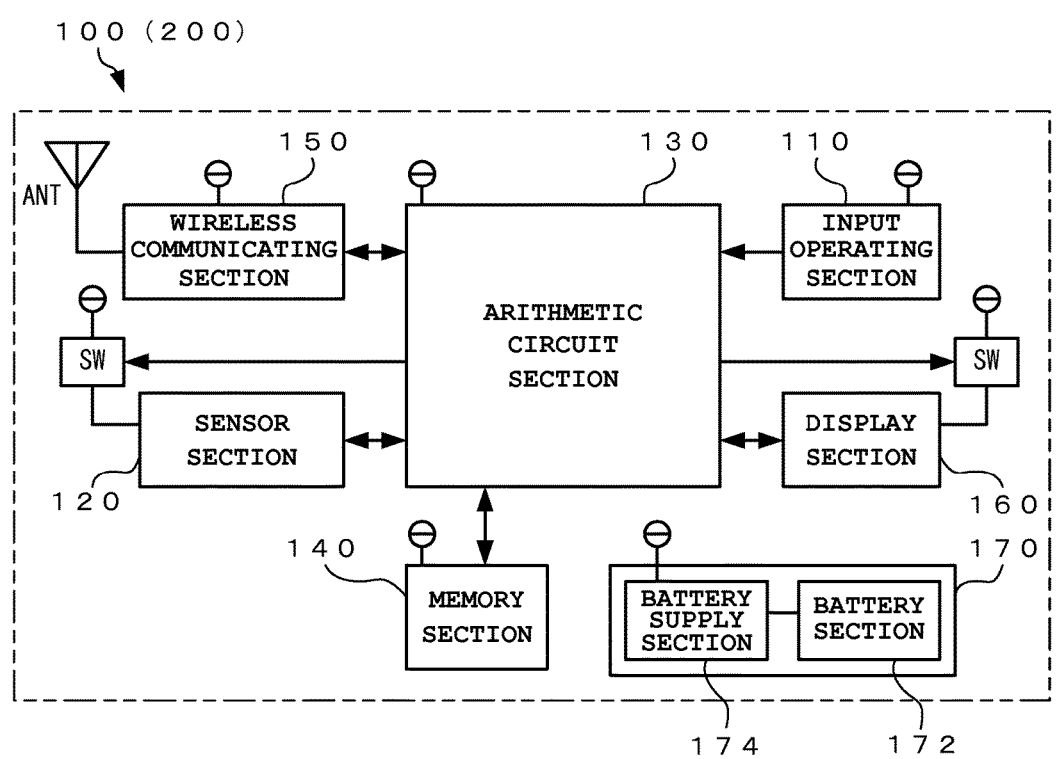
FIG. 2 is a schematic block diagram showing an embodiment of an information communication terminal device to be applied in the electronic device system according to the present invention.

FIG. 2 is a schematic block diagram showing an embodiment of an information communication terminal device to be applied in the electronic device system according to the present invention.

An embodiment of the electronic device system according to the present invention includes, for example, a first information communication terminal device (first terminal device) 100 on a transmitting side which performs an operation for activating a second information communication terminal device (second terminal device) 200 and the second information communication terminal device 200 on a receiving side which is activated by the first information communication terminal device 100, as shown in FIG. 1. The second information communication terminal device 200 is, for example, a smartphone (advanced portable telephone), sensor device, or the like.

Here, the first information communication terminal device 100 and the second information communication terminal device 200 are both structured to have a predetermined wireless communication function so that mutual data transmission and reception can be performed via wireless communication.

In FIG. 1, for convenience of explanation, the first information communication terminal device 100 and the second information communication terminal device 200 are connected together via wireless communication in a one-to-one relation. However, the present invention is not limited thereto and, for example, a plurality of information communication terminal devices may be mutually connected together via wireless communication in a one-to-many relation.

In this communication system, the first information communication terminal device 100 has an outer appearance of a wristwatch and is worn on a wrist or the like of the user.

The second information communication terminal device 200, when having a form of a smartphone, a tablet terminal, or the like, is carried by being put in the user's bag, a pocket of the user's clothing, or the like.

Also, when having a function for serving as a sensor device such as a heart rate meter or a motion sensor, the second information communication terminal device 200 is mounted on a predetermined part of the body of the user (such as the chest or hip).

The first information communication terminal device 100 and the second information communication terminal device 200 according to the present embodiment have a substantially equivalent structure except for a functional portion unique to each of the information communication terminal devices.

The portions other than the functional portion unique to each of the first information communication terminal device 100 and the second information communication terminal device 200 are structured as those shown in FIG. 2.

That is, each information communication terminal device has an input operating section 110, a sensor section 120, an arithmetic circuit section (sleep mode release control section, operating state judging section, and start notification control section) 130, a memory section 140, a wireless communicating section 150, a display section 160, and a power supply section 170, as shown in FIG. 2.

Note that reference numeral 210 in FIG. 1 corresponds to the input operating section 110 in FIG. 2, and reference numeral 260 corresponds to the display section 160.

The input operating section 110 is an input means such as a press button or a touch panel provided on each housing of the first information communication terminal device 100 and the second information communication terminal device 200.

This input operating section 110 is used to perform an operation for mutually connecting the first information communication terminal device 100 and the second information communication terminal device 200 in sleep mode together via wireless communication, releasing each sleep mode, and returning (wake-up) them to normal operation modes. For example, the user performs an input operation therewith.

By this input operation using the input operating section 110, a start instruction signal for releasing a sleep mode is outputted from the arithmetic circuit section 130 described below.

Note that the configuration of the input operating section 110 is not limited to the above-described configuration where the user voluntarily (actively) performs an input operation thereon.

For example, a configuration may be adopted in which the first information communication terminal device 100 and the second information communication terminal device 200 each include a sensor section which detects a state change applied from outside (such as vibration), various state changes around them (such as change in illuminance), and the like, and a start instruction signal for releasing a sleep mode is outputted based on an output signal from this sensor section. That is, in the configuration where the first information communication terminal device 100 and the second information communication terminal device 200 are each provided with a vibration sensor (or an acceleration sensor), an illumination sensor, or the like, these sensors may be applied as the input operating section 110.

The sensor section 120 is a sensor means such as a GPS (Global Positioning System) receiving circuit, an acceleration sensor, a gyro sensor, a geomagnetic sensor, or a heart rate detection circuit provided in each of the first information communication terminal device 100 and the second information communication terminal device 200.

This sensor section 120 acquires various physical or biological sensor data when various application software (such as software for measuring and recording a traveling route, an exercise state, a heart rate, etc.) are executed by the arithmetic circuit section 130 described below.

Also, this sensor section 120 is supplied with driving power generated by the power supply section 170 described below via a power supply switch SW1.

The ON/OFF state of the power supply switch SW1 is controlled by the arithmetic circuit section 130 described below. When the first information communication terminal device 100 and the second information communication terminal device 200 are in the sleep mode, the power supply switch SW1 is set to an OFF state by the arithmetic circuit section 130 so as to interrupt the supply of driving power to the sensor section 120, whereby the function of the sensor section 120 is temporarily stopped.

The arithmetic circuit section 130 is an arithmetic device such as a CPU (Central Processing Unit) or MPU (Microprocessor Unit), and executes a predetermined control program and a predetermined algorithm program stored in the memory section 140 described below.

As a result, the arithmetic circuit section 130 controls various operations, such as a sensing operation by the sensor section 120, mutual data transmission and reception between the first information communication terminal device 100 and the second information communication terminal device 200 by the wireless communicating section 150, and display of various information by the display section 160.

For example, when the first information communication terminal device 100 and the second information communication terminal device 200 are each in a sleep mode, the arithmetic circuit section 130 controls the power supply switches SW1 and SW2 provided to the sensor section 120 and the display section 160 so as to interrupt the supply of driving power to at least the sensor section 120 and the display section 160.

In this sleep mode, the arithmetic circuit section 130 performs control to set a minimum function operating state in which only a specific and partial circuit portion of the wireless communicating section 150 (refer to FIG. 3) described below is operated.

Then, the arithmetic circuit section 130 performs control for releasing the sleep mode of the first information communication terminal device 100 and the second information communication terminal device 200 via wireless communication and returning them to normal operation modes, based on the user's input operation by the input operating section 110.

Note that the control program and the algorithm program to be executed by the arithmetic circuit section 130 may be embedded in advance in the arithmetic circuit section 130. The electronic device system control method (sleep mode releasing method) according to the present embodiment will be described in detail further below.

The memory section 140 stores sensor data acquired by the sensor section 120 and display data to be displayed on the display section 160.

In addition, the memory section 140 stores data for use when the predetermined control program and algorithm program are executed by the arithmetic circuit section 130 and data generated at that time.

The control program and the algorithm program to be executed by the arithmetic circuit section 130 may be stored in this memory section 140.

Note that the entire or part of the memory section 140 may be in a form of a removable storage medium such as a memory card, and may be structured to be removable from the first information communication terminal device 100.

The wireless communicating section 150 has a transmitting circuit and a receiving circuit for transmitting and receiving various data between the first information communication terminal device 100 and the second information communication terminal device 200.

When the first information communication terminal device 100 and the second information communication terminal device 200 are in the sleep mode, this wireless communicating section 150 is set to be in a minimum function operating state where a normal operating state is kept only in a specific and partial circuit portion of the transmitting circuit and the receiving circuit and the functions of the other circuit portions are temporarily stopped.

Note that the wireless communicating section 150 has a circuit structure supporting various wireless communication methods such as Bluetooth (registered trademark), Bluetooth (registered trademark) low energy (LE) communication, and Wi-Fi (wireless fidelity (registered trademark)) communication.

The circuit structure of the wireless communicating section 150 according to the present embodiment will be described in detail further below.

The display section 160 is structured to have a display panel of, for example, a liquid-crystal type capable of color or monochrome display or a light-emitting-element type such as an organic EL element.

The display section 160 displays, for example, various information related to application software to be executed on the first information communication terminal device 100 and the second information communication terminal device 200 and information related to a communication condition between the first information communication terminal device 100 and the second information communication terminal device 200 in the wireless communicating sections 150 described above.

This display section 160 is supplied with driving power generated by the power supply section 170 described below via the power supply switch SW2. The ON/OFF state of the power supply switch SW2 is controlled by the arithmetic circuit section 130, as with the above-described sensor section 120. When the first information communication terminal device 100 and the second information communication terminal device 200 are in the sleep mode, the power supply switch SW2 is set to an OFF state by the arithmetic circuit section 130 so as to interrupt the supply of driving power to the display section 160, whereby the function of the display section 160 is temporarily stopped.

The power supply section 170 has a battery section 172 which outputs a set power supply voltage and a battery supply section 174 which generates and outputs predetermined driving power based on the power supply voltage supplied from the battery section 172.

The driving power generated by the power supply section is supplied directly or via the power supply switch SW1 or SW2 to each section of the above-described first information communication terminal device 100 or the second information communication terminal device 200.

Note that, as the battery section 172, a primary battery such as a commercially-available coin-type battery or button-type battery or a secondary battery such as a lithium-ion battery or a nickel-metal-hydride battery can be used.

Also, in addition to these primary battery and secondary battery, a power supply by energy harvest technology for generating electricity by energy such as vibrations, light, heat, or electromagnetic waves can be used singly or in combination as the battery section 172.

(Circuit Structure of Wireless Communicating Section)

Next, the circuit structure of the wireless communicating section 150 to be applied in the first information communication terminal device 100 or the second information communication terminal device 200 according to the present embodiment.

Figure 3:
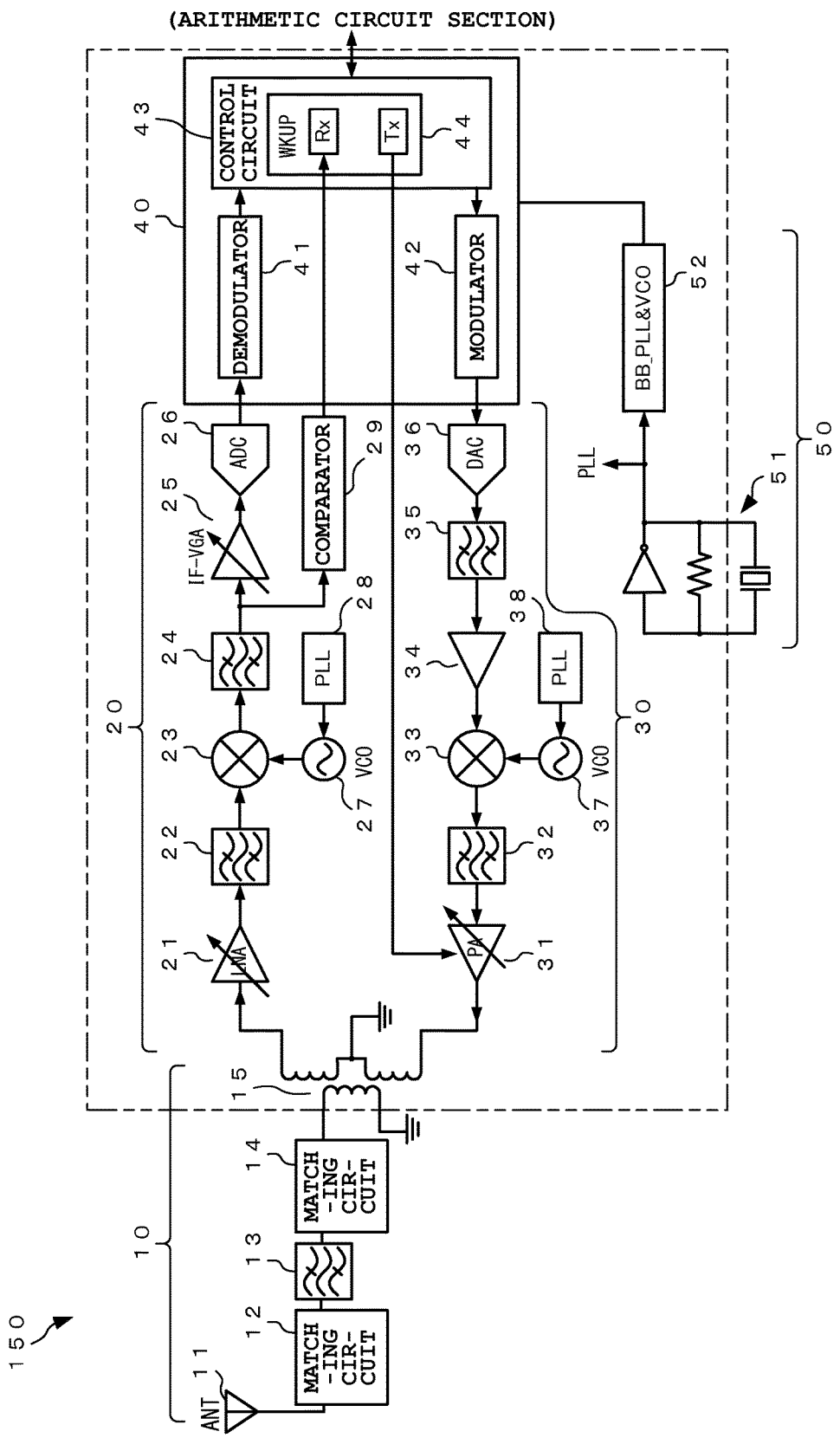
FIG. 3 is a circuit structural diagram showing an example of a wireless communicating section to be applied in the information communication terminal device according to the present embodiment.

FIG. 3 is a circuit structural diagram showing an example of the wireless communicating section 150 to be applied in the information communication terminal device 100 or 200 according to the present embodiment.

In this example, a circuit structure to be applied when Bluetooth (registered trademark) communication is used as a wireless communication method for the wireless communicating section 150 is shown. Note that, in a case where another wireless communication method is used, a substantially equivalent circuit structure is applied.

In the present embodiment, the information communication terminal devices 100 and 200 constituting the electronic device system are each provided with the wireless communicating section 150 having the circuit structure shown in FIG. 3.

In FIG. 3, each signal transmission between sections has been shown for convenience of explanation, with use of arrowed lines. However, in practice, signal transmission between specific sections is performed as appropriate, based on the control status of the wireless communicating section 150.

The wireless communicating section 150 to be applied in the present embodiment mainly includes, for example, an antenna section 10, a receiving section 20, a transmitting section 30, a communication control section (sleep mode release control section and operation state judging section) 40, and a reference frequency generating section 50, as shown in FIG. 3.

The antenna section 10 has a transmission/reception antenna 11, matching circuits 12 and 14, a band-pass filter 13, and a transmission/reception switching section (or antenna duplexer section) 15, and transmits and receives a predetermined high-frequency signal (here, an analog RF signal of 2.4 GHz) to be applied in Bluetooth (registered trademark) communication between the first information communication terminal device 100 and the second information communication terminal device 200.

That is, in a receiving state, the antenna section 10 extracts signal components of a predetermined frequency band by the band-pass filter 13 from a high-frequency signal (received signal) received via the transmission/reception antenna 11, and outputs the signal components via the transmission/reception switching section 15 to the receiving section 20 described below.

On the other hand, in a transmitting state, the antenna section 10 limits, by the band-pass filter 13, the frequency band of a high-frequency signal generated by the transmitting section 30 described below and sent via the transmission/reception switching section 15, and then transmits the high-frequency signal from the transmission/reception antenna 11 as a transmission signal.

The receiving section 20 has a gain-variable low-noise amplifier (LNA) 21, a band-pass filter 22, a mixer 23, a band-pass filter 24, a variable gain amplifier (IF-VGA) 25, an A/D (analog-to-digital) converter 26, a voltage controlled oscillator (VCO) 27, a phase-locked loop (PLL) 28, and a comparator 29.

In the receiving section 20, the low-noise amplifier 21 amplifies a reception signal (analog RF signal) received by the antenna section 10, and the band-pass filter 22 extracts signal components in a predetermined frequency band and sends the resultant signal to the mixer 23.

Then, based on a reception frequency generated by the phase-locked loop (PLL) 28 and the voltage controlled oscillator (VCO) 27, the mixer 23 down-converts the sent reception signal to a signal in an intermediate frequency (IF) band.

Subsequently, the frequency band of the down-converted reception signal (analog IF signal) is further limited by the band-pass filter (channel selection filter) 24, whereby a signal channel is selected. Then, the reception signal is amplified by the variable gain amplifier (VGA) 26 to a predetermined signal level, converted by the A/D converter 26 to a digital signal, and outputted as a reception baseband signal to a communication control section 40 described below.

In the present embodiment, the receiving section 20 takes the reception signal (analog IF signal) down-converted by the mixer 23 with the frequency band limited by the band-pass filter 24 into the comparator 29. Then, the power (or signal level) of the reception signal and a predetermined threshold are compared, and the comparison result is outputted to a wakeup management block 44 of the communication control section 40 described below.

The transmitting section 30 has a gain-variable power amplifier (PA) 31, a band-pass filter 32, a mixer 33, an amplifier 34, a band-bass filter 35, a D/A (digital-to-analog) converter 36, a voltage-controlled oscillator (VCO) 37, and a phase-locked loop (PLL) 38.

In the transmitting section 30, the D/A converter 36 converts a baseband signal, which is a digital signal generated and sent from the communication control section 40 described below, to an analog signal (transmission signal), and the band-pass filter 35 and the amplifier 34 amplifies signal components in a predetermined frequency band and send the resultant signal to the mixer 33. Here, the amplifier 34, the band-pass filter 35, and the D/A converter 36 constitutes an output circuit section for the transmission baseband signal.

Then, based on a transmission frequency generated by phase-locked loop (PLL) 38 and the voltage controlled oscillator (VCO) 37, the mixer 33 up-converts the sent transmission signal to a signal in a high-frequency (RF) band.

Subsequently, the frequency band of the up-converted transmission signal (analog RF signal) is further limited by the band-pass filter 32 and the power amplifier (PA) 31, and sent to the antenna section 10.

The communication control section 40, which is a baseband core processor for performing digital signal processing, includes a demodulator 41, a modulator 42, and a control circuit 43.

A reception baseband signal sent from the receiving section 20 and demodulated via the demodulator 41 is inputted to this control circuit 43.

Subsequently, the signal inputted via the receiving section 20 is sent to the arithmetic circuit section 130 shown in FIG. 2 for use in a program to be executed by the arithmetic circuit section 130.

Then, based on the program executed by the arithmetic circuit section 130, a predetermined transmission baseband signal is generated by the control circuit 43.

The transmission baseband signal generated by the control circuit 43 is modulated via the modulator 42 and sent to the transmitting section 30.

In the present embodiment, the control circuit 43 has the wakeup management block 44.

This wakeup management block 44 sends a signal related to processing for releasing the sleep mode of the first information communication terminal device 100 or the second information communication terminal device 200 to the arithmetic circuit section 130, based on a comparison result Rx acquired from a comparison between the electric power of a reception signal outputted from the comparator 29 of the receiving section 20 and a predetermined threshold.

In addition, the wakeup management block 44 outputs a wakeup signal Tx for the transmitting section 30 to generate and send a start notification signal, based on a start instruction signal sent from the arithmetic circuit section 130.

This wakeup signal Tx is inputted to, for example, the power amplifier (PA) 31 at the last stage of the transmitting section 30. Here, specific circuit portions (the power amplifier (PA) 31, the band-pass filter 32, the mixer 33, the voltage controlled oscillator (VCO) 37, and the phase-locked loop (PLL) 38) of the transmitting section 30 are operating and, by the wakeup signal Tx inputted to the power amplifier (PA) 31, a start notification signal is generated with a signal wave which is not a modulated signal wave (hereinafter referred to as an unmodulated wave). This unmodulated wave is, for example, a carrier wave.

Then, the start notification signal is transmitted via the antenna section 10 to the second information communication terminal device 200.

The reference frequency generating section 50, which has a quartz oscillator circuit 51 and a frequency generator circuit for the communication control section 40 (BB_PLL&VCO) 52, generates a clock signal having a reference frequency for defining the operations of the phase-locked loop (PLL) 28 provided in the receiving section 20, the phase-locked loop (PLL) 38 provided in the transmitting section 30, and the communication control section 40, and supplies it to these PLLs and section.

<Electronic Device System Control Method>

Next, a method of controlling the electronic device system according to the present invention is described.

Here, a control operation (sleep mode releasing method) for releasing a sleep mode via wireless communication and returning it to a normal operation mode in the electronic device system including the first information communication terminal device 100 and the second information communication terminal device 200 having the above-described circuit structure is described.

A series of processing operations described below are achieved based on a predetermined algorithm program executed by the arithmetic circuit section 130 of the first information communication terminal device 100 and the second information communication terminal device 200.

Figure 4:
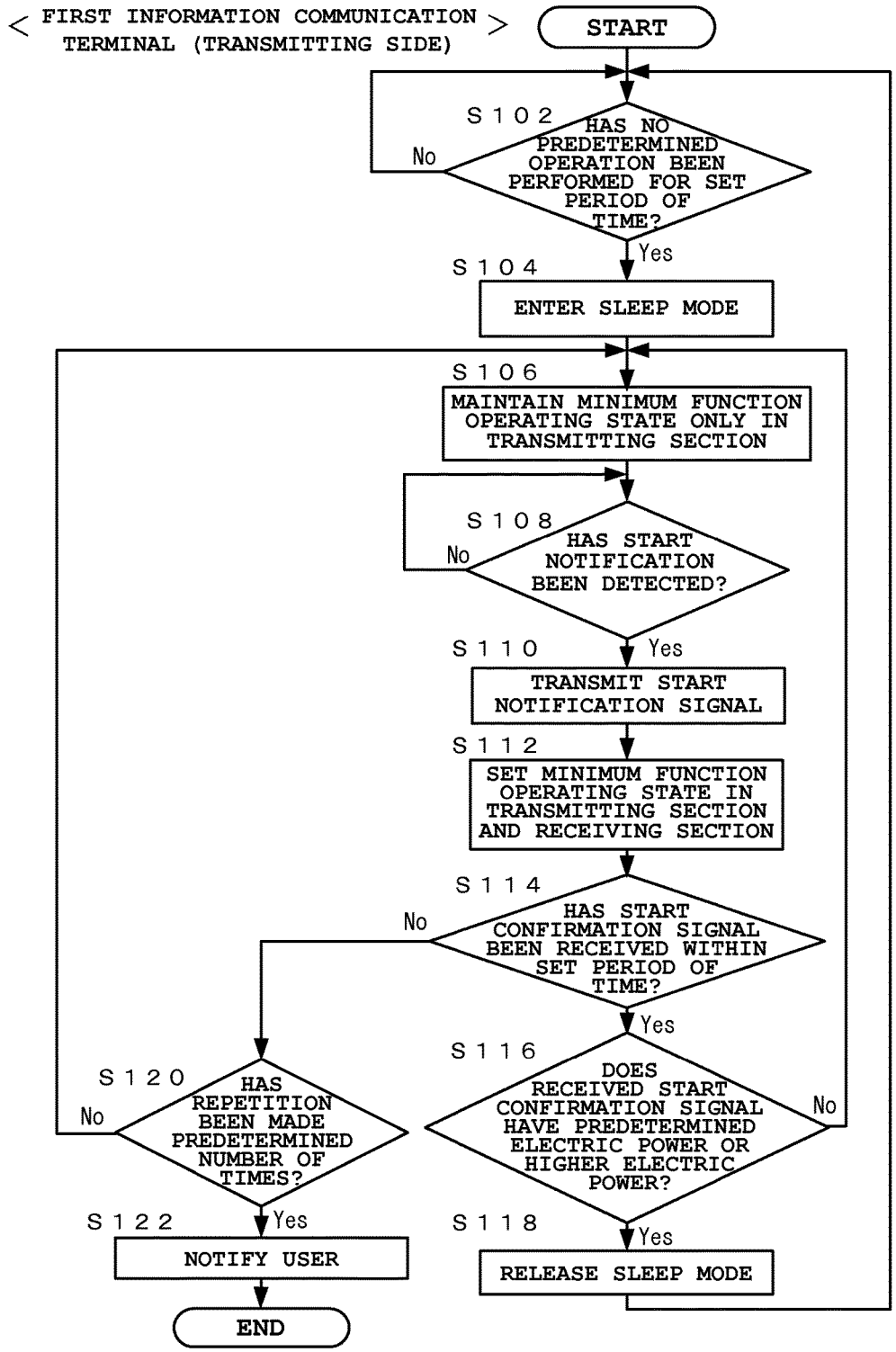
FIG. 4 is a flowchart showing an example of a method of controlling a first information communication terminal device according to the present embodiment.

FIG. 4 is a flowchart showing an example of a method for controlling the first information communication terminal device according to the present embodiment.

Figure 5:
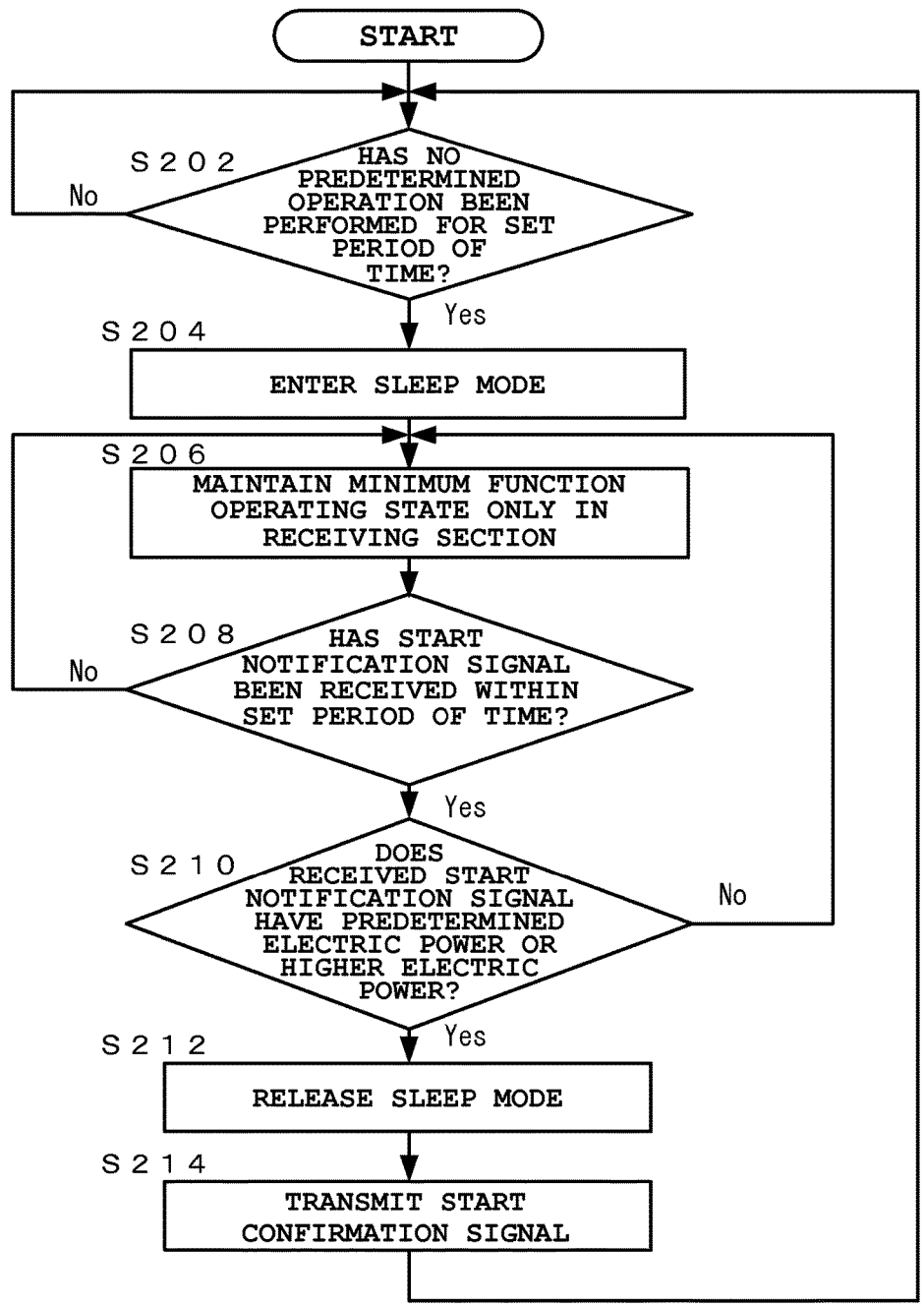
FIG. 5 is a flowchart showing an example of a method of controlling a second information communication terminal device according to the present embodiment.

FIG. 5 is a flowchart showing an example of a method for controlling the second information communication terminal device according to the present embodiment.

Here, the first information communication terminal device 100 is taken as a terminal device on a side (hereinafter referred to as a "transmitting side" for convenience of explanation) that transmits a start notification signal for releasing a sleep mode to the second information communication terminal device 200, and the second information communication terminal device 200 is taken as a terminal device on a side (hereinafter referred to as a "receiving side" for convenience of explanation) where the start notification signal transmitted from the first information communication terminal device 100 is received and the sleep mode is released.

FIG. 6 to FIG. 13 are circuit structural diagrams showing the first and second information communication terminal devices in the electronic device system control method according to the present embodiment.

Here, FIG. 6, FIG. 8, FIG. 9, FIG. 12, and FIG. 13 are circuit structural diagrams each showing an operating state of the first information communication terminal device on the transmitting side.

Figure 7:
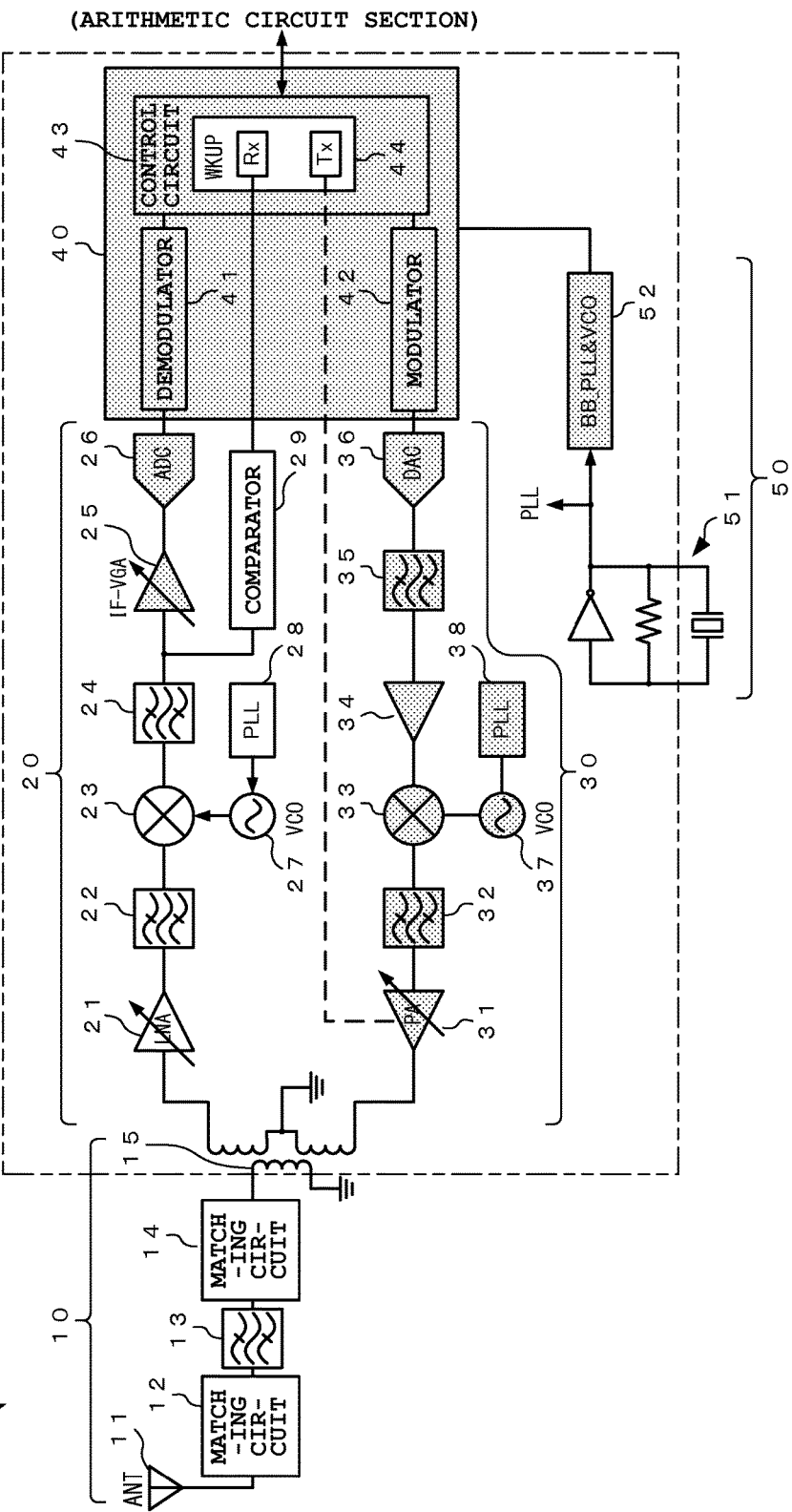
FIG. 7 is a circuit structural diagram showing a first operating state of the second information communication terminal device in the electronic device system control method according to the present embodiment.
Figure 10:
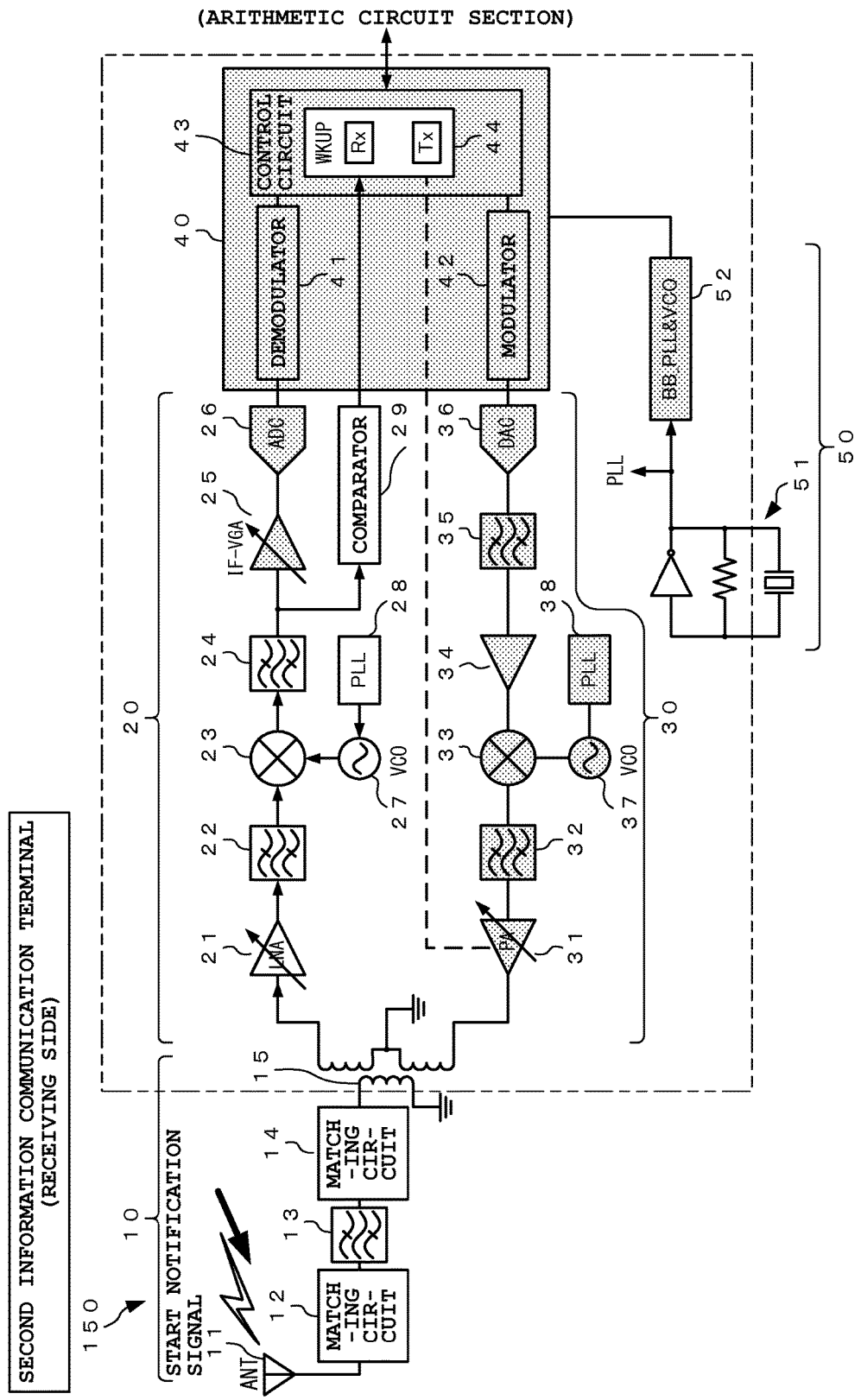
FIG. 10 is a circuit structural diagram showing a second operating state of the second information communication terminal device in the electronic device system control method according to the present embodiment.
Figure 11:
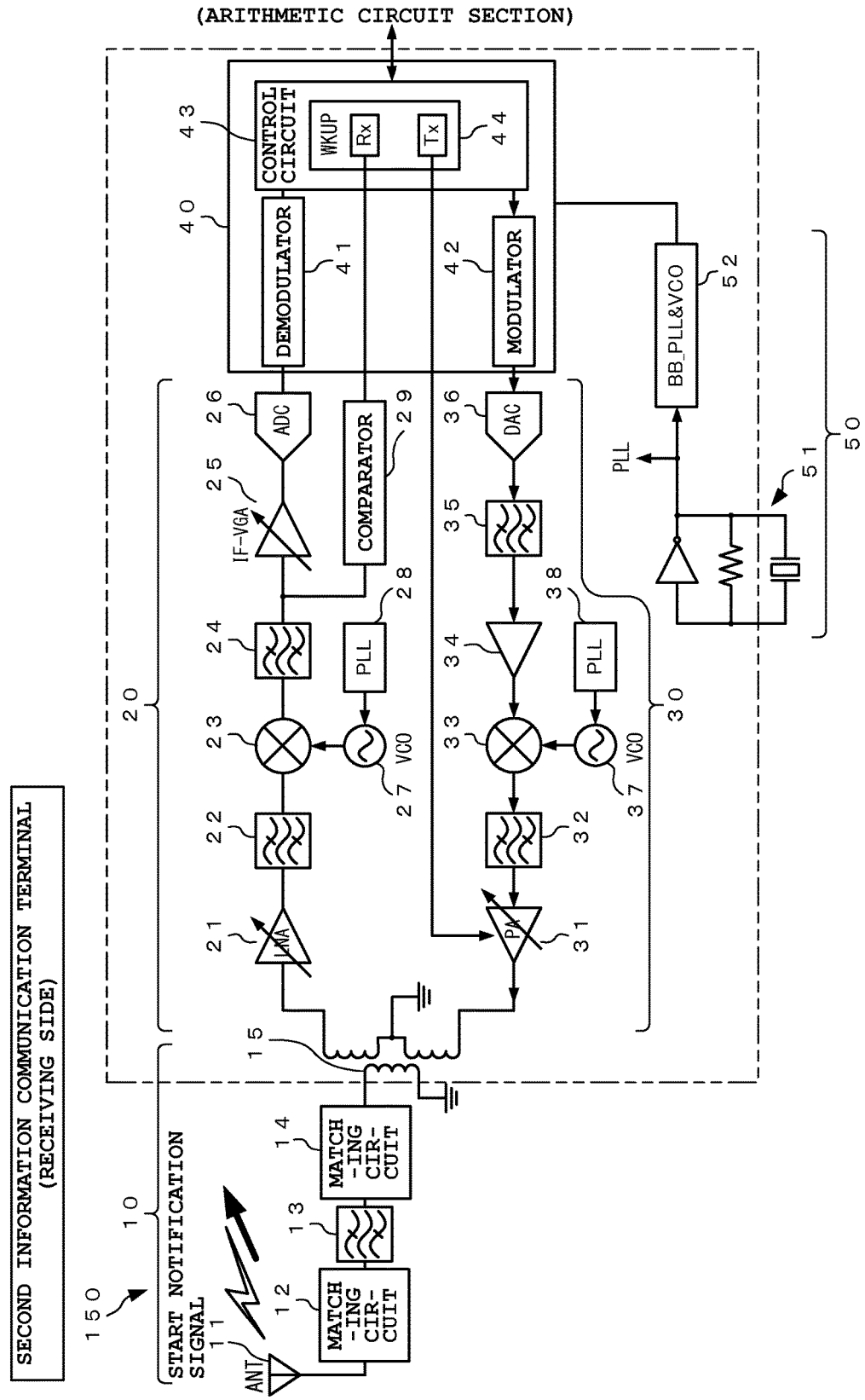
FIG. 11 is a circuit structural diagram showing a third operating state of the second information communication terminal device in the electronic device system control method according to the present embodiment.

Also, FIG. 7, FIG. 10, and FIG. 11 are circuit structural diagrams each showing an operating state of the second information communication terminal device on the receiving side.

Note that, in FIG. 6 to FIG. 13, a structure in a non-operating state is shown by being hatched (colored with gray) for convenience of explanation.

In the electronic device system control method (sleep mode releasing method) according to the present embodiment, first, the arithmetic circuit section 130 judges whether a predetermined operation such as an operation by the input operating section 110 has been performed within a set period of time (Steps S102 and S202), with the first information communication terminal device 100 and the second information communication terminal device 200 being in a normal operating state, as shown in the flowcharts of FIG. 4 and FIG. 5.

When judged that a predetermined operation has not been performed within the set period of time, the arithmetic circuit section 130 interrupts the supply of driving power from the power supply section 170 to a predetermined section of the first information communication terminal device 100 and the second information communication terminal device 200 so that the first information communication terminal device 100 and the second information communication terminal device 200 enter the sleep mode (Steps S104 and S204). As a result, the power consumption of the first information communication terminal device 100 and the second information communication terminal device 200 is reduced.

Figure 6:
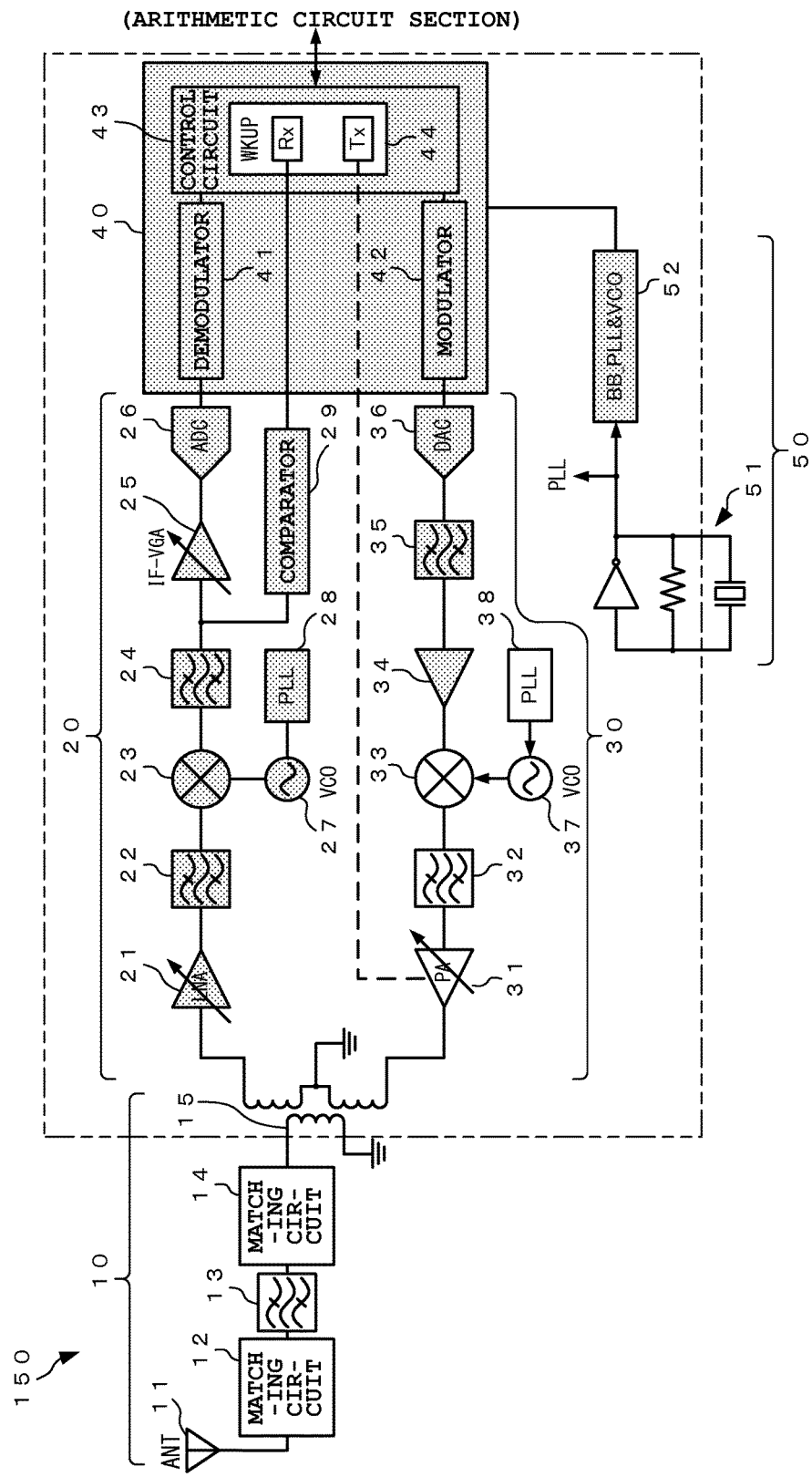
FIG. 6 is a circuit structural diagram showing a first operating state of the first information communication terminal device in an electronic device system control method according to the present embodiment.

Here, in the sleep mode of the first information communication terminal device 100 on the transmitting side, the supply of driving power to the receiving section 20, the communication control section 40 except the wakeup management block 44, and the reference frequency generating section 50 except the quartz oscillator circuit 51 in the wireless communicating section 150 is interrupted, whereby a state where these functions are temporarily stopped is set, as shown in FIG. 6.

In the transmitting section 30, the supply of driving power to a circuit section for outputting a transmission baseband signal (the amplifier 34, the band-pass filter 35, and the D/A converter 36) except a circuit section which generates and outputs an unmodulated wave (carrier wave) of a specific frequency (for example, 2.4 GHz to 2.48 GHz) is interrupted, whereby a state where these functions are temporarily stopped is set.

In FIG. 6, the circuit section, which generates and outputs an unmodulated wave of a specific frequency, includes the power amplifier (PA) 31, the band-pass filter 32, the mixer 33, the voltage controlled oscillator (VCC) 37, and the phase-locked loop (PLL) 38.

That is, in the sleep mode of the first information communication terminal device 100, a minimum function operating state is set in which driving power is supplied only to a circuit section of the wireless communicating section 150 required for generating and outputting an unmodulated wave to be transmitted to the second information communication terminal device 200 (notification signal transmitting section) so as to keep its operating state; and the supply of driving power to the other sections is interrupted, so that these sections are set in a non-operating state (Step S106).

Here, the unmodulated wave of the specific frequency is used as a start notification signal for releasing the sleep mode of the second information communication terminal device 200 on the receiving side.

In the sleep mode of the first information communication terminal device 100 described above, the gain of the gain-variable power amplifier (PA) 31 has been fixed at a set value, and set values of frequencies of the voltage controlled oscillator (VCO) 37 and the phase-locked loop (PLL) 38 have been set at a specific frequency unique to the start notification signal.

As a result of this configuration, in the first information communication terminal device 100 on the transmitting side, a time required from when start notification is given based on an input operation by the user (or the detection of a state change by a specific sensor) until when a start notification signal is generated by the transmitting section 30 of the wireless communicating section 150 and transmitted to the second information communication terminal device 200 on the receiving side can be reduced (pass quickly) as compared to a case where the above-described settings are not made, as will be described below.

In the sleep mode of the first information communication terminal device 100, the gain set value of the power amplifier (PA) 31 has been set at a minimum value required with respect to a necessary distance for communication with the second information communication terminal device 200.

That is, the set value of gain of the power amplifier (PA) 31 is set at a value corresponding to the set value of a communication distance between the first information communication terminal device 100 and the second information communication terminal device 200 allowing the second information communication terminal device 200 to receive a start notification signal.

Here, when this communication distance is set at a relatively short distance, the set value of gain is set at a relatively small value. Conversely, when this communication distance is set at a relatively long distance, the set value of gain is set at a relatively large value.

As a result of this configuration, power consumption in the first information communication terminal device 100 on the transmitting side can be reduced to a minimum required value.

On the other hand, in the sleep mode of the second information communication terminal device 200 on the receiving side, the supply of driving power to the transmitting section 30, the communication control section 40 except the wakeup management block 44, and the reference frequency generating section 50 except the quartz oscillator circuit 51 in the wireless communicating section 150 is interrupted, whereby a state where these functions are temporarily stopped is set, as shown in FIG. 7.

In the receiving section 20, the supply of driving power to a circuit section for inputting a reception baseband signal (the variable gain amplifier 25 and the A/D converter 26) except a circuit section which down-converts an unmodulated wave (carrier wave) of a specific frequency (the low-noise amplifier (LNA) 21, the band-pass filter 22, the mixer 23, the voltage controlled oscillator (VCO) 27, and the phase-locked loop (PLL) 28) is interrupted, whereby a state where these functions are temporarily stopped is set.

That is, in the sleep mode of the second information communication terminal device 200, a minimum function operating state is set in which driving power is supplied only to a circuit section of the wireless communicating section 150 required for receiving and judging an unmodulated wave transmitted from the first information communication terminal device 100 (notification signal receiving section) so as to keep its operating state; and the supply of driving power to the other sections is interrupted, so that these sections are set in a non-operating state (Step S206).

Here, in the sleep mode of the second information communication terminal device 200 described above, the gain of the gain-variable low-noise amplifier (LNA) 21 has been fixed at a set value, and set values of frequencies of the voltage controlled oscillator (VCO) 27 and the phase-locked loop (PLL) 28 have been set at a specific frequency unique to the start notification signal.

As a result of this configuration, a start notification signal of an unmodulated wave transmitted from the first information communication terminal device 100 on the transmitting side can be received without loss, as will be described below.

In the sleep mode of the second information communication terminal device 200, the gain set value of the low-noise amplifier (LNA) 21 has been set at a minimum value required with respect to the necessary distance for communication with the first information communication terminal device 100.

That is, the set value of gain of the low-noise amplifier (LNA) 21 is set at a value corresponding to the set value of a communication distance between the first information communication terminal device 100 and the second information communication terminal device 200 allowing the second information communication terminal device 200 to receive a start notification signal.

Here, when this communication distance is set at a relatively short distance, the set value of gain is set at a relatively small value. Conversely, when this communication distance is set at a relatively long distance, the set value of gain is set at a relatively large value.

As a result of this configuration, power consumption in the second information communication terminal device 200 on the receiving side can be reduced to a minimum required value.

Figure 8:
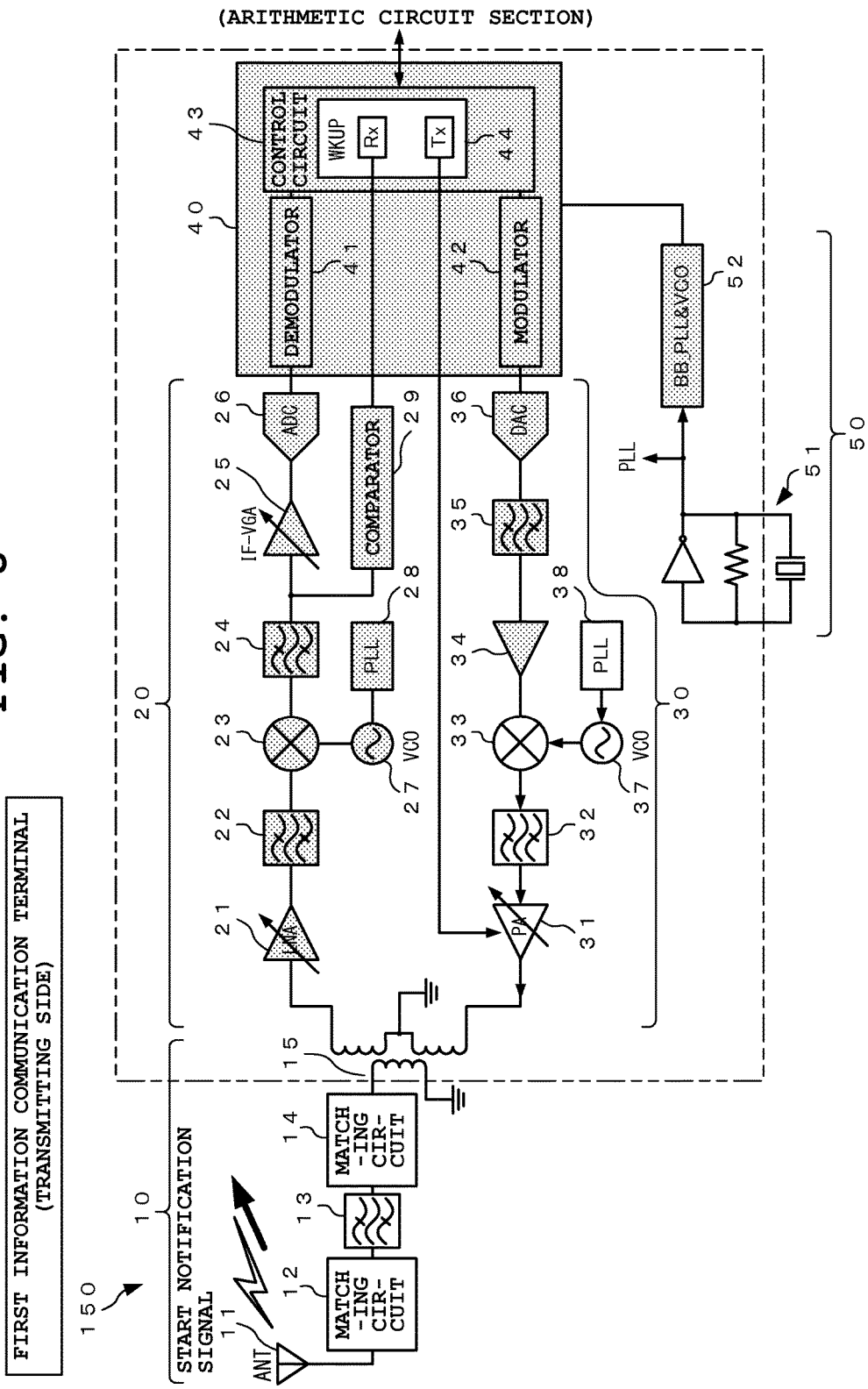
FIG. 8 is a circuit structural diagram showing a second operating state of the first information communication terminal device in the electronic device system control method according to the present embodiment.

Next, in the first information communication terminal device 100, when an input operation by the user is performed (or a state change is detected by a specific sensor) and thereby start notification for releasing the sleep mode of the second information communication terminal device 200 is given (Step S108), the wireless communicating section 150 of the first information communication terminal device 100 outputs a wakeup signal Tx from the wakeup management block 44, as shown in FIG. 8.

Then, by the wakeup signal Tx being inputted to the power amplifier (PA) 31 of the transmitting section 30, a specific circuit portion of the transmitting section 30 (the power amplifier (PA) 31, the band-pass filter 32, the mixer 33, the voltage controlled oscillator (VCO) 37, the phase-locked loop (PLL) 38 operates to generate a start notification signal of an unmodulated wave, based on a specific frequency generated by the phase-locked loop (PLL) 38 and the voltage controlled oscillator (VCO) 37.

This start notification signal generated by the transmitting section 30 is transmitted via the antenna section 10 to the second information communication terminal device 200 (Step S110).

Figure 9:
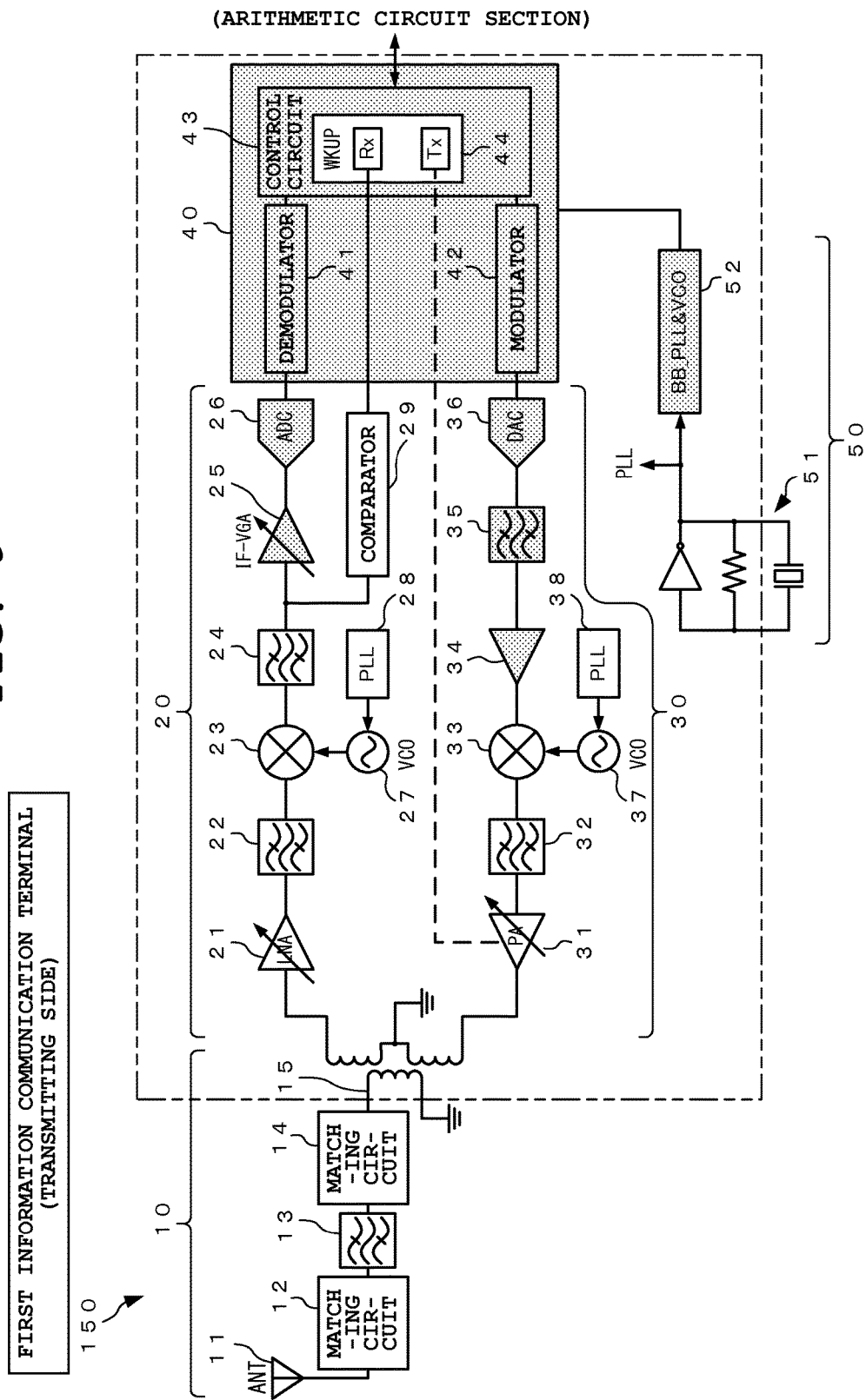
FIG. 9 is a circuit structural diagram showing a third operating state of the first information communication terminal device in the electronic device system control method according to the present embodiment.

Then, after performing the above-described operation of generating and transmitting a start notification signal of an unmodulated wave, the wireless communicating section 150 of the first information communication terminal device 100 enters an operating state shown in FIG. 9.

That is, the wireless communicating section 150 of the first information communication terminal device 100 is set in a minimum function operating state in which a circuit section (confirmation signal receiving section) of the wireless communicating section 150 required for receiving and judging a start confirmation signal transmitted from the second information communication terminal device 200, which will be described further below, is in an operating state (that is, a receivable state), in addition to a circuit section (notification signal transmitting section) of the wireless communicating section 150 shown in FIG. 6 and FIG. 8 which is required for generating and transmitting an unmodulated wave, as shown in FIG. 9 (Step S112).

Next, the wireless communicating section 150 of the second information communication terminal device 200 waits to receive a start notification signal of an unmodulated wave transmitted from the first information communication terminal device 100. Then, when a start notification signal is not received within a set period of time (Step S208), the wireless communicating section 150 returns to Step S206, and maintains the minimum function operating state in which only a circuit section of the receiving section 20 required for receiving a start notification signal transmitted from the first information communication terminal device 100 is in an operating state.

Conversely, when the wireless communicating section 150 of the second information communication terminal device 200 receives a start notification signal transmitted from the first information communication terminal device 100 within a set period of time (Step S208), the comparator 29 compares and judges whether the electric power of the start notification signal down-converted by the mixer 23 is equal to or higher than a predetermined threshold, as shown in FIG. 10 (Step S210).

When the electric power of the start notification signal is not equal to or higher than the predetermined threshold, the arithmetic circuit section 130 judges that the received signal is not a proper start notification signal (for example, noise). Then, the arithmetic circuit section 130 returns to Step S206, and maintains the minimum function operating state in which only a circuit portion of the receiving section 20 related to the reception of a start notification signal is in an operating state. Hereafter, the arithmetic circuit section 130 repeats the operation of waiting for reception of a start notification signal from the first information communication terminal device 100.

On the other hand, when the electric power of the start notification signal received in the wireless communicating section 150 of the second information communication terminal device 200 is equal to or higher than the predetermined threshold, the comparator 29 outputs its comparison result (that is, start notification) Rx to the wakeup management block 44 of the communication control section 40.

Then, by the wakeup management block 44 notifying the arithmetic circuit section 130 of the reception of the start notification signal for releasing the sleep mode, the arithmetic circuit section 130 restarts the supply of driving power to each section of the second information communication terminal device 200 to release the sleep mode and return them to a normal operating state (Step S212).

Here, the wireless communicating section 150 of the second information communication terminal device 200 enters an operating state shown in FIG. 11. That is, a state is set in which a circuit section (that is, the entire wireless communicating section 150) required to transmit and receive various data to and from the first information communication terminal device 100 on the transmitting side via wireless communication is in an operating state.

Next, in the wireless communicating section 150 after the sleep mode of the second information communication terminal device 200 is released, a specific circuit section of the transmitting section 30 (the power amplifier (PA) 31, the band-pass filter 32, the mixer 33, the voltage controlled oscillator (VCO) 37, the phase-locked loop (PLL) 38) and the confirmation signal transmitting section of the antenna section 10 generate and transmit a start confirmation signal which is not a modulated signal wave (hereinafter referred to as an unmodulated wave) of a specific frequency, as shown in FIG. 11. This unmodulated wave is, for example, a carrier wave.

Then, the start notification signal generated by the transmitting section 30 is transmitted via the antenna section 10 to the first information communication terminal device 100 (Step S214).

As such, the second information communication terminal device 200 on the receiving side performs the series of processing shown in the flowchart of FIG. 5, and thereby returns to a normal operating state from the sleep mode, based on the start notification signal transmitted from the first information communication terminal device 100 on the transmitting side.

Then, after transmitting a start confirmation signal generated in the transmitting section 30 to the first information communication terminal device 100 via the antenna section 10, the second information communication terminal device 200 again repeats the processing of Step S202 and the following processing and, when a predetermined operation is not performed within a set period of time, re-enters the sleep mode (Step S204).

On the other hand, if the first information communication terminal device 100 on the transmitting side receives a start confirmation signal of an unmodulated wave transmitted from the second information communication terminal device 200 within a set period of time (Step S114) when a circuit section of the receiving section 20 of the wireless communicating section 150 required to receive and judge a start confirmation signal transmitted from the second information communication terminal device 200 on the receiving side is being operated (in a receivable state; Step S112) as shown in FIG. 9, the following processing is performed.

Figure 12:
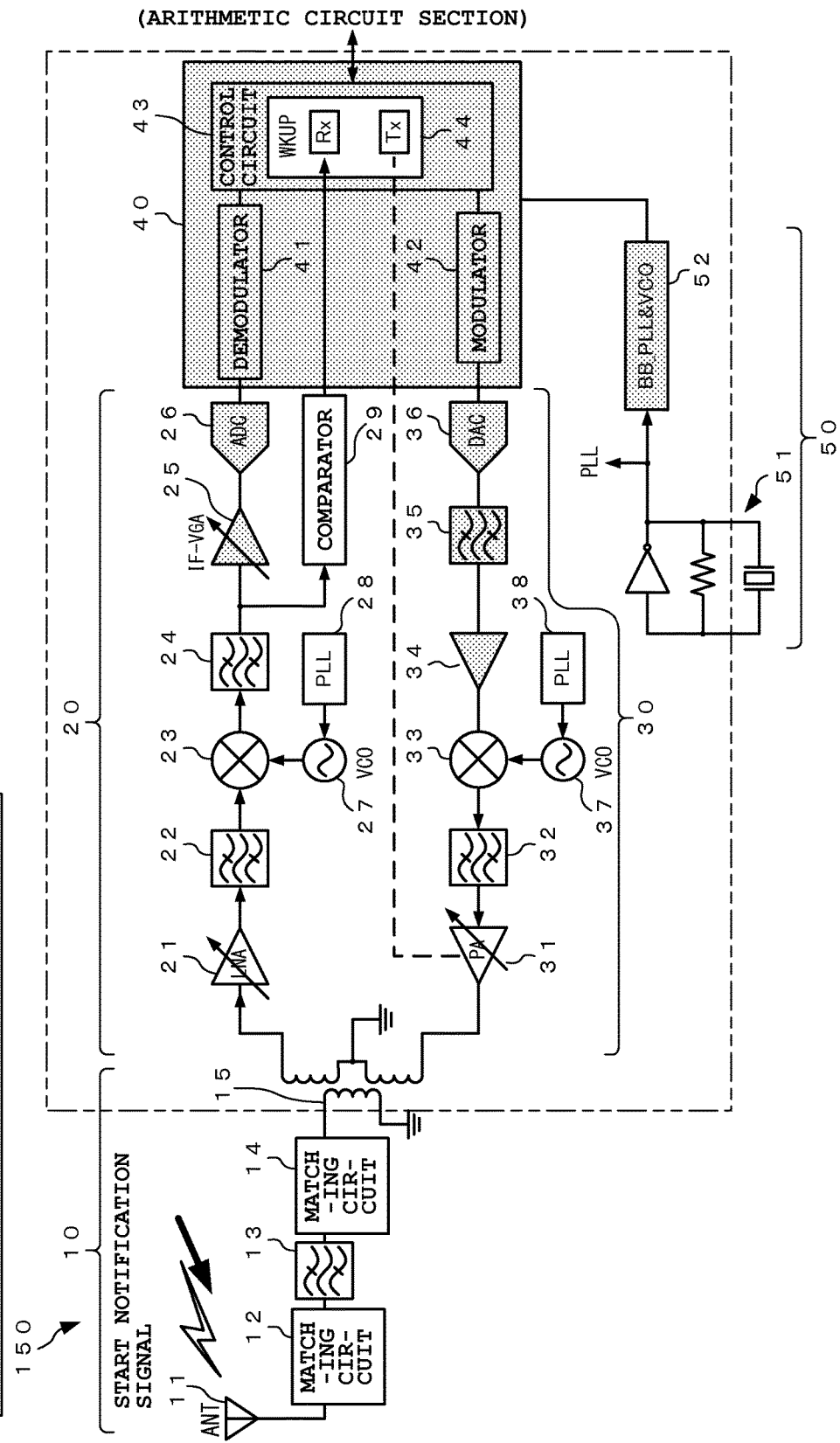
FIG. 12 is a circuit structural diagram showing a fourth operating state of the first information communication terminal device in the electronic device system control method according to the present embodiment.

First, the comparator 29 compares and judges whether the electric power of the start confirmation signal down-converted by the mixer 23 is equal to or higher than a predetermined threshold, as shown in FIG. 12 (Step S116).

When the electric power of the start confirmation signal is not equal to or higher than the predetermined threshold, the arithmetic circuit section 130 judges that the received signal is not a proper notification signal (for example, noise).

Accordingly, the arithmetic circuit section 130 returns to Step S106, and maintains the minimum function operating state in which only a circuit section of the transmitting section 30 required to generate and output a start notification signal is in an operating state. Hereafter, the arithmetic circuit section 130 repeats the operation in which a start notification signal is transmitted when start notification is given.

Here, the wireless communicating section 150 of the first information communication terminal device 100 enters the operating state shown in FIG. 6.

On the other hand, when the electric power of the start confirmation signal received in the wireless communicating section 150 of the first information communication terminal device 100 is equal to or higher than the predetermined threshold, the comparator 29 outputs its comparison result (that is, start confirmation) Rx to the wakeup management block 44 of the communication control section 40.

Then, by the wakeup management block 44 notifying the arithmetic circuit section 130 of the reception of the start confirmation signal, the arithmetic circuit section 130 confirms (judges) that the sleep mode of the second information communication terminal device 200 has been released and the second information communication terminal device 200 has returned to a normal operating state.

Accordingly, the arithmetic circuit section 130 restarts the supply of driving power to each section of the first information communication terminal device 100 based on the notification of the reception of the start confirmation signal so as to release the sleep mode and return them to a normal operating state (Step S118).

Figure 13:
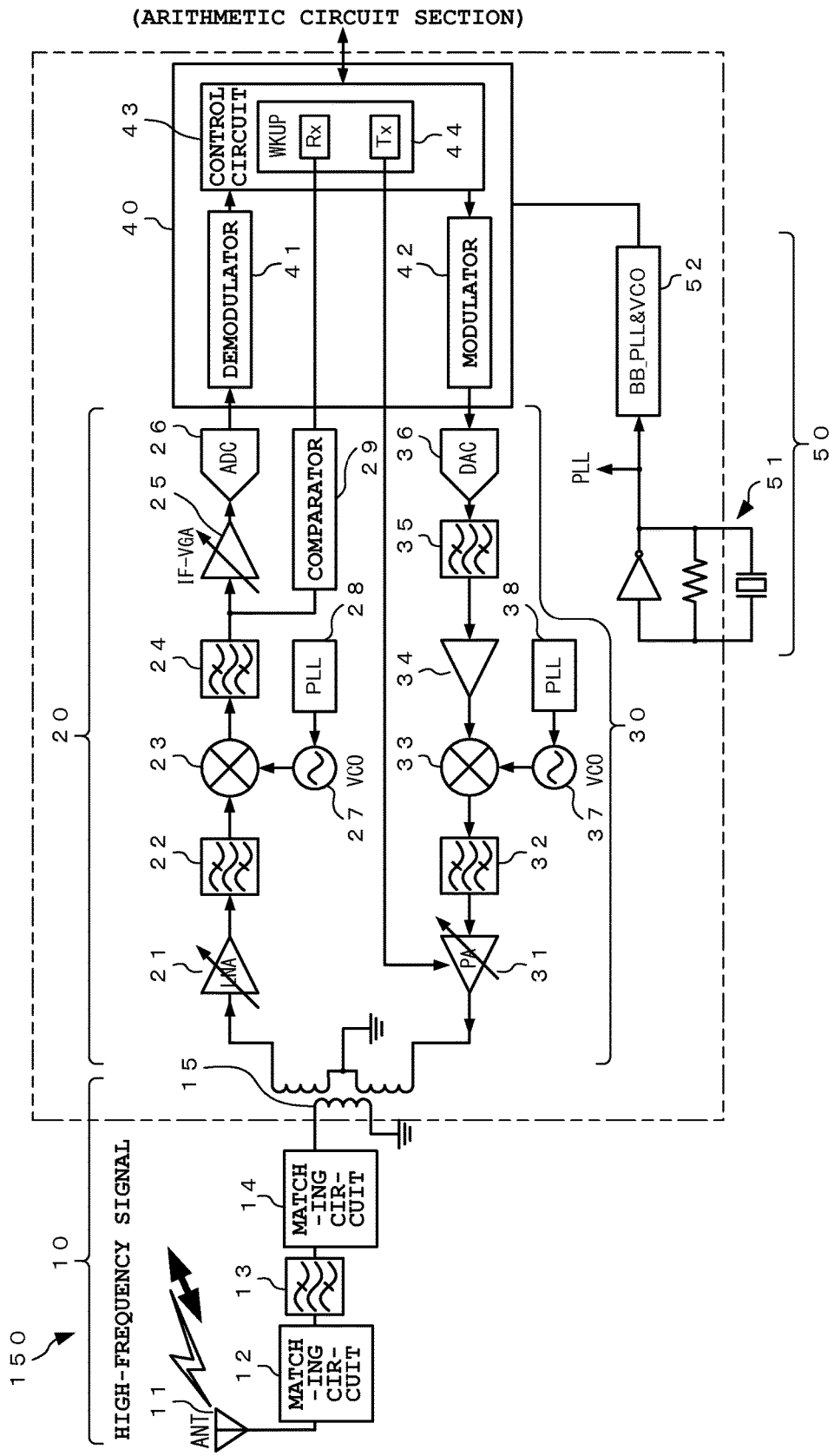
FIG. 13 is a circuit structural diagram showing a fifth operating state of the first information communication terminal device in the electronic device system control method according to the present embodiment.

Here, the wireless communicating section 150 of the first information communication terminal device 100 enters an operating state shown in FIG. 13.

That is, a state is set in which a circuit section (that is, the entire wireless communicating section 150) required to transmit and receive various data to and from the second information communication terminal device 200 on the receiving side via wireless communication is in an operating state.

As such, the first information communication terminal device 100 on the transmitting side performs the series of processing shown in the flowchart of FIG. 4, and returns to a normal operating state from the sleep mode based on the start confirmation signal transmitted from the second information communication terminal device 200 receiving the start notification signal.

As a result, the sleep mode of both of the first information communication terminal device 100 and the second information communication terminal device 200 are released, and a communicating state between the first information communication terminal device 100 and the second information communication terminal device 200 is established in which normal data transmission and reception can be performed.

Then, the first information communication terminal device 100 again repeats the processing of Step S102 and the following processing and, when a predetermined operation is not performed within a set period of time, enters the sleep mode (Step S104).

On the other hand, if the first information communication terminal device 100 has not received a start confirmation signal from the second information communication terminal device 200 within a set period of time (Step S114) when a circuit section of the receiving section 20 of the wireless communicating section 150 required to receive and judge a start confirmation signal transmitted from the second information communication terminal device 200 is being operated (a receivable state; Step S112) as shown in FIG. 9, the following processing is performed.

First, the communication control section 40 counts the number of times a start notification signal has been transmitted but a start confirmation signal has not been received. Then, when the current status has not reached a set number of times (Step S120), the arithmetic circuit section 130 judges that the non-reception of a start confirmation signal is due to a minor (recoverable) cause.

Accordingly, the arithmetic circuit section 130 returns to Step S106, and maintains the minimum function operating state in which only a circuit portion of the transmitting section 30 required to generate and output a start notification signal is in an operating state. Hereafter, the arithmetic circuit section 130 repeats the operation in which a start notification signal is transmitted when start notification is given.

On the other hand, when the state in which a start notification signal has been transmitted but a start confirmation signal has not been received has been repeated the predetermined number of times (Step S120) in the wireless communicating section 150 of the first information communication terminal device 100, the arithmetic circuit section 130 judges that a severe (non-recoverable) anomaly is present in the communication condition between the first information communication terminal device 100 on the transmitting side and the second information communication terminal device 200 on the receiving side and the processing operations.

Accordingly, the arithmetic circuit section 130 displays a message such as "SLEEP MODE CANNOT BE RELEASED" on the display section 160 so as to notify the user (Step S122).

As described above, in the electronic device system according to the present embodiment, a start notification signal transmitted from the first information communication terminal device 100 on the transmitting side when start notification is given by an input operation or the like is received by the second information communication terminal device 200 on the receiving side, whereby the sleep mode of the second information communication terminal device 200 is released and the second information communication terminal device 200 returns to a normal operating state.

Here, as the start notification signal of the present embodiment, an unmodulated wave (carrier wave) of a specific frequency is used in place of a normal modulated signal wave.

In the sleep mode of the first information communication terminal device 100 on the transmitting side, a minimum function operating state is maintained in which at least a circuit section of the transmitting section 30 of the first information communication terminal device 100 required to generate and output the above-described start notification signal of the unmodulated wave of the specific frequency is in an operating state set with a predetermined operating condition (such as gain and frequency).

In addition, in the sleep mode of the second information communication terminal device 200 on the receiving side, a minimum function operating state is maintained in which at least a circuit section of the receiving section 20 of the second information communication terminal device 200 required to receive and judge the start notification signal is in an operating state set with a predetermined operating condition (such as gain and frequency).

Also, in the sleep mode of these first information communication terminal device 100 and the second information communication terminal device 200, the communicating state (wireless communication link state) between the first information communication terminal device 100 and the second information communication terminal device 200 is not maintained, and whether the sleep mode can be released is judged depending on the value of the electric power of the start notification signal which is generated when the sleep mode is released.

Accordingly, in the present embodiment, the operating states of only the minimum circuit sections, which are required to transmit and receive a start notification signal of an unmodulated wave that is generated when the sleep mode is released, are maintained. As a result, power consumption in the sleep mode of the information communication terminal devices and power consumption when the sleep mode is released can be reduced, as compared to a method where a normal communicating state (wireless communication link state) between the information communication terminal devices on the transmitting side and the receiving side is always maintained.

Also, in the present embodiment, since an unmodulated wave (carrier wave) of a specific frequency is used as a start notification signal for releasing the sleep mode of the information communication terminal device, the power consumption of the circuit sections related to the transmission and reception of a start notification signal can be reduced, and a start notification signal can be quickly generated and transmitted to release the sleep mode so as to return the device to a normal operating state (quick wakeup), as compared to a method where a normal modulated signal wave is used as a start notification signal.

Moreover, in the sleep mode of the first information communication terminal device 100 in the present embodiment, the set value of gain of the power amplifier (PA) 31 is set at a minimum required value with respect to a necessary communication distance. In the sleep mode of the second information communication terminal device 200, the set value of gain of the low-noise amplifier (LNA) 21 is set at a minimum required value with respect to the necessary communication distance. Therefore, the power consumption of the first information communication terminal device 100 and the second information communication terminal device 200 can be reduced to a minimum required value according to the necessary communication distance.

Furthermore, in the present embodiment, whether the sleep mode can be released is judged depending on the value of the electric power of a start notification signal with an unmodulated wave of a specific frequency. Therefore, noise influence on the operation of releasing the sleep mode via wireless communication can be reduced, and the sleep mode of the information communication terminal device can be reliably released.

Still further, in the present embodiment, even when the operation of releasing the sleep mode of the information communication terminal device is being performed, if a state where a predetermined operation has not been performed continues for a set period of time, control is performed so that the sleep mode is maintained or the current mode is again returned to the sleep mode. As a result, the power consumption of the information communication terminal device can be further reduced.

Yet still further, in the present embodiment, in addition to the control operation where a start notification signal from the information communication terminal device on the transmitting side is transmitted to the information communication terminal device on the receiving side via wireless communication so as to release the sleep mode of the information communication terminal device on the receiving side, the control operation is performed in which whether the sleep mode of the information communication terminal device on the receiving side has been released is confirmed (judged) by the information communication terminal device on the transmitting side based on a start confirmation signal transmitted from the information communication terminal device on the receiving side.

As a result of this configuration, when the sleep mode of the information communication terminal device on the receiving side cannot be released, a processing operation of retransmitting (retry) a start notification signal from the information communication terminal device on the transmitting side can be performed. Therefore, the sleep mode of the information communication terminal device on the receiving side can be reliably released so as to return the device to a normal state.

Yet still further, in the present embodiment, an unmodulated wave of a specific frequency is used as a start confirmation signal, whether the sleep mode of the information communication terminal device on the receiving side has been released is confirmed (judged) depending on the value of electric power of the unmodulated wave, and the sleep mode of the information communication terminal device on the transmitting side is released. Therefore, the information communication terminal devices on the transmitting side and the receiving side can be reliably returned to a normal operating state.

In addition, since noise influence on the operation of confirming the release of the sleep mode via wireless communication can be reduced, the sleep mode of the information communication terminal device can be reliably released.

Modification Examples

Next, modification examples of the electronic device system control method according to the present embodiment are described.

In the above-described embodiment, the control method has been described in which a start notification signal is transmitted from the information communication terminal device on the transmitting side; the sleep mode of the information communication terminal device on the receiving side is released thereby; whether the sleep mode of the information communication terminal device on the receiving side has been released is confirmed by the information communication terminal device on the transmitting side by a start confirmation signal transmitted from the information communication terminal device on the receiving side being received; and the sleep mode of the information communication terminal device on the transmitting side is released thereby.

However, in a first modification example of the electronic device system control method according to the present embodiment, a control operation is performed in which, when start notification is given in the information communication terminal device on the transmitting side, a start notification signal is transmitted from the information communication terminal device on the transmitting side; the sleep mode of the information communication terminal device on the transmitting side is released; and the sleep mode of the information communication terminal device on the receiving side is released by the start notification signal being received.

That is, the sleep mode of the information communication terminal device on the transmitting side is released only on condition that start notification is given, without requiring (receiving) a start confirmation signal transmitted from the information communication terminal device on the receiving side.

According to the first modification example of the present embodiment, when start notification is given in the information communication terminal device on the transmitting side, the sleep mode of both of the information communication terminal devices on the transmitting side and the receiving side can be quickly released with low power consumption so as to return them to normal operating states.

In a second modification example of the electronic device system control method according to the present embodiment, when start notification is given, the information communication terminal device on the transmitting side transmits a start notification signal, and the information communication terminal device on the receiving side confirms whether start notification has been given and transmits a first start confirmation signal to the information communication terminal device on the transmitting side.

Subsequently, by receiving the first start confirmation signal transmitted from the information communication terminal device on the receiving side, the information communication terminal device on the transmitting side confirms that a communicating state with the information communication terminal device on the receiving side has been established, releases the sleep mode of the information communication terminal device on the transmitting side, and transmits a second start confirmation signal to the information communication terminal device on the receiving side.

Then, by receiving the second start confirmation signal transmitted from the information communication terminal device on the transmitting side, the information communication terminal device on the receiving side confirms whether the sleep mode of the information communication terminal device on the transmitting side has been released, and releases the sleep mode of the information communication terminal device on the receiving side.

That is, when the wireless communicating sections of both of the information communication terminal devices on the transmitting side and the receiving side are returned to normal operating states, and a communicating state between the information communication terminal devices on the transmitting side and the receiving side is established, the sleep mode of both of the information communication terminal devices are released.

According to the second modification example of the present embodiment, whether a communicating state between the information communication terminal devices on the transmitting side and the receiving side has been established is confirmed (judged), and then the sleep mode of both of the information communication terminal devices are released. Therefore, the information communication terminal devices on the transmitting side and the receiving side can be reliably returned to normal operating states.

In the above-described embodiments, an unmodulated wave of a specific frequency is used as a start notification signal and a start confirmation signal to be transmitted and received between the information communication terminal devices, and start notification and start confirmation are performed depending on the power level (comparison result). However, the present invention is not limited thereto, and a normal modulated signal wave may be used as the start confirmation signal.

While the present invention has been described with reference to the preferred embodiments, it is intended that the invention be not limited by any of the details of the description therein but includes all the embodiments which fall within the scope of the appended claims.

What is claimed is:

1. An electronic device system comprising:
   a first terminal device having a first wireless communicating section which performs wireless communication, and being configured to enter a first sleep mode in which an operation of part of circuits of the first wireless communicating section is stopped; and
   a second terminal device having a second wireless communicating section which performs wireless communication, and being configured to enter a second sleep mode in which an operation of part of circuits of the second wireless communicating section is stopped,
   wherein the first wireless communicating section of the first terminal device in the first sleep mode transmits a start notification signal for releasing the second terminal device from the second sleep mode,
   wherein the second wireless communicating section of the second terminal device in the second sleep mode receives the start notification signal transmitted from the first wireless communicating section of the first terminal device, releases the second terminal device from the second sleep mode depending on the start notification signal, and then transmits a start confirmation signal which is an unmodulated wave,
   wherein the first wireless communicating section comprises:
      a notification signal transmitting section which transmits a first carrier wave for use in the wireless communication as the start notification signal;
      a confirmation signal receiving section which receives the start confirmation signal transmitted from the second terminal device when the second terminal device is released from the second sleep mode;
      an operating state judging section which judges whether the second terminal device has been released from the second sleep mode; and
      a modulation circuit section which modulates the first carrier wave corresponding to specific information, and
   wherein the first terminal device in the first sleep mode:
      (i) controls the notification signal transmitting section to operate,
      (ii) controls the confirmation signal receiving section and the operating state judging section to operate after the notification signal transmitting section transmits the start notification signal,
      (iii) controls circuit sections other than the confirmation signal receiving section, the operating state judging section and the notification signal transmitting section in the first wireless communicating section to stop operation,
      (iv) receives, by the confirmation signal receiving section, the start confirmation signal, and
      (v) judges, by the operating state judging section, whether the second terminal device has been released from the second sleep mode, depending on a value of electric power of the start confirmation signal.

2. The electronic device system according to claim 1, wherein the second wireless communicating section of the second terminal device has a notification signal receiving section configured to receive the start notification signal and a sleep mode release control section which releases the second terminal device from the second sleep mode depending on a value of electric power of the start notification signal, and
   wherein the second terminal device in the second sleep mode controls the notification signal receiving section and the sleep mode release control section in the second wireless communicating section to operate, and controls a circuit section other than the notification signal receiving section and the sleep mode release control section in the second wireless communicating section to stop operation.

3. The electronic device system according to claim 1,
   wherein the unmodulated wave of the start confirmation signal is a second carrier wave for use in wireless communication,
   wherein the second wireless communicating section of the second terminal device has a confirmation signal transmitting section which transmits the second carrier wave as the start confirmation signal, and a modulation circuit section which modulates the second carrier wave corresponding to specific information,
   wherein the sleep mode release control section of the second wireless communicating section controls the confirmation signal transmitting section to transmit the start confirmation signal when releasing the second terminal device from the second sleep mode.

4. A terminal device comprising:
   a wireless communicating section which comprises:
      a notification signal transmitting section which transmits, via wireless communication, a carrier wave as a start notification signal for releasing another terminal device from a sleep mode in which an operation of part of circuits is stopped,
      a confirmation signal receiving section which receives a start confirmation signal that is an unmodulated wave and that is transmitted by the another terminal device after the another terminal device receives the start notification signal from the terminal device and is released from the sleep mode, and
      an operation state judging section which judges whether the another terminal device has been released from the sleep mode depending on a value of electric power of the start confirmation signal transmitted by the another terminal device, and
      a modulation circuit section which modulates the carrier wave, corresponding to specific information,
   wherein the terminal device is configured to enter a sleep mode in which an operation of the modulation circuit section is stopped, and
   wherein the terminal device in the sleep mode:
      (i) controls the notification signal transmitting section in the wireless communicating section to operate,
      (ii) controls the confirmation signal receiving section and the operating state judging section in the wireless communicating section to operate after the notification signal transmitting section transmits the start notification signal,
      (iii) controls circuit sections other than the confirmation signal receiving section, the operating state judging section and the notification signal transmitting section and the notification signal transmitting section in the wireless communicating section to stop operation, (iv) receives, by the confirmation signal receiving section, the start confirmation signal transmitted by the another terminal device, and (v) judges, by the operating state judging section, whether the another terminal device has been released from the sleep mode, depending on the value of electric power of the start confirmation signal transmitted by the another terminal device.

5. A method for controlling an electronic device system including (i) a first terminal device having a first wireless communicating section which performs wireless communication and being configured to enter a first sleep mode in which an operation of part of circuits of the first wireless communicating section is stopped and (ii) a second terminal device having a second wireless communicating section which performs wireless communication and being configured to enter a second sleep mode in which an operation of part of circuits of the second wireless communicating section is stopped, wherein the first wireless communicating section of the first terminal comprises a notification signal transmitting section, which transmits a carrier wave for use in the wireless communication as a start notification signal for releasing the second terminal device from the second sleep mode, a confirmation signal receiving section which receives the start confirmation signal, an operating state judging section which judges whether the second terminal device has been released from the second sleep mode and a modulation circuit section which modulates the carrier wave corresponding to specific information, the method comprising:

transmitting the carrier wave as the start notification signal, by the notification signal transmitting section of the first wireless communicating section of the first terminal device, receiving the start notification signal transmitted from the first wireless communicating section of the first terminal device, by the second wireless communicating section of the second terminal device in the second sleep mode, and releasing the second terminal device from the second sleep mode depending on the start notification signal, transmitting, when the second terminal device is released from the second sleep mode, a start confirmation signal which is an unmodulated wave, by the second wireless communicating section of the second terminal device, receiving, by the confirmation signal receiving section of the first wireless communicating section of the first terminal device, the start confirmation signal transmitted from the second terminal device, and judging, by the operating state judging section of the first wireless communicating section of the first terminal device, whether the second terminal device has been released from the second sleep mode, depending on a value of electric power of the start confirmation signal, wherein the method further comprises, when the first terminal device is in the first sleep mode, controlling the notification signal transmitting section in the first wireless communicating section to operate, controlling the confirmation signal receiving section and the operating state judging section to operate after the notification signal transmitting section transmits the start notification signal, and controlling circuit sections other than the confirmation signal receiving section, the operating state judging section and the notification signal transmitting section in the first wireless communicating section to stop operation.

6. A non-transitory computer-readable storage medium having an electronic device system control program stored thereon that is executable by a computer in an electronic device system including (i) a first terminal device having a first wireless communicating section which performs wireless communication and being configured to enter a first sleep mode in which an operation of part of circuits of the first wireless communicating section is stopped and (ii) a second terminal device having a second wireless communicating section which performs wireless communication and being configured to enter a second sleep mode in which an operation of part of circuits of the second wireless communicating section is stopped, wherein the first wireless communicating section of the first terminal comprises a notification signal transmitting section which transmits a carrier wave for use in the wireless communication as a start notification signal for releasing the second terminal device from the second sleep mode, a confirmation signal receiving section which receives the start confirmation signal, an operating state judging section which judges whether the second terminal device has been released from the second sleep mode and a modulation circuit section which modulates the carrier wave corresponding to specific information, the program causing the computer to perform functions comprising:

transmitting the carrier wave as the start notification signal, by the notification signal transmitting section of the first wireless communicating section of the first terminal device, receiving the start notification signal transmitted from the first wireless communicating section of the first terminal device, by the second wireless communicating section of the second terminal device in the second sleep mode, and releasing the second terminal device from the second sleep mode depending on a value of electric power of the start notification signal, transmitting, when the second terminal device is released from the second sleep mode, a start confirmation signal which is an unmodulated wave, by the second wireless communicating section of the second terminal device, receiving, by the confirmation signal receiving section of the first wireless communicating section of the first terminal device, the start confirmation signal transmitted from the second terminal device, and judging, by the operating state judging section of the first wireless communicating section of the first terminal device, whether the second terminal device has been released from the second sleep mode, depending on a value of electric power of the start confirmation signal, wherein, when the first terminal device is in the first sleep mode, the program further causes the computer to perform functions comprising:

controlling the notification signal transmitting section in the first wireless communicating section to operate, controlling the confirmation signal receiving section and the operating state judging section to operate after the notification signal transmitting section transmits the start notification signal, and controlling circuit sections other than the confirmation signal receiving section, the operating state judging section and the notification signal transmitting section in the first wireless communicating section to stop operation.

\* \* \* \* \*